United States Patent Office 2,938,909
Patented May 31, 1960

2,938,909

PHTHALIDYL ETHERS OF POLYGLYCOLS

Donald D. Wheeler and David C. Young, Midland, Mich., assignors to The Dow Chemical Company, Midland, Mich., a corporation of Delaware No Drawing. Filed Apr. 30, 1956, Ser. No. 581,349

4 Claims. (Cl. 260—343.3)

This invention relates to derivatives of polyglycols and a method for their preparation.

The novel products of the present invention are phthalidyl derivatives of polyglycol compounds having an average molecular weight of from 100 to 10,000 due to the polyglycol portion thereof.

The term "polyglycol compound" as herein employed is inclusive of polyglycols and polyglycol ethers having at least one free hydroxyl group, and characterized by having as a unit within its molecular structure an alkyleneoxy group, $-C_nH_{2n}O-$, wherein $n$ is an integer of from 2 to 4, inclusive, and may have any of these values within the same molecule; that is, the same alkyleneoxy group, or two or more different alkyleneoxy groups may be present as units in the polyglycol chain. "Polyglycol" as herein employed refers to a molecular structure containing a chain of alkyleneoxy units as set forth above and terminating at the two ends of the chain in free hydroxyl groups. "Polyglycol ether" as herein employed refers to a molecular structure in which one end of a chain of alkyleneoxy units terminates in a hydroxyl group and the other in an aryl or alkyl radical, and is inclusive of such ethers wherein the alkyl radical is derived from polyhydric alcohols such as glycerol or pentaerythritol. When the alkyl radical is derived from a polyhydric alcohol it is to be understood that each of the hydroxyl groups of said alcohol has been substituted with a polyglycol chain as set forth above. The preferred polyglycols when operating within the scope of this invention are polyethylene glycols having a molecular weight range of from 100 to 10,000, polypropylene glycols having a range of from 130 to 5000, polybutylene glycols having a range of from 170 to 3000, and poly(mixed alkyleneoxy) glycols having a range of from 100 to 10,000. Preferably, these polyglycols are those derived from ethylene oxide, 1,2-propylene oxide and 1,2- and 2,3-butylene oxides. Phthalidyl derivatives of polyglycols have the general structure

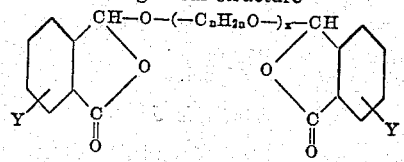

In this and succeeding formulae, Y represents hydrogen or chlorine, $n$ is an integer of from 2 to 4, inclusive, and $x$ is an integer representing the total number of alkyleneoxy groups present to give a polyglycol in the above indicated molecular weight range and has a value of at least 2. Phthalidyl derivatives of polyglycol ethers have the general structure

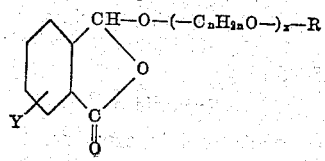

wherein R represents an aryl or alkyl radical and wherein the alkyl radical is inclusive of radicals derived from polyhydric alcohols. In the latter case, each hydroxyl group of the polyhydric alcohol is substituted with a phthalidyl polyglycol chain as set forth above. A structural formula of phthalidyl derivatives of polyglycol ethers which is inclusive of ethers of polyhydric alcohols may be represented as

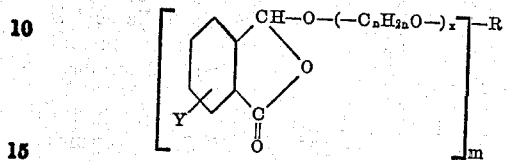

wherein R represents a hydrocarbon radical of a hydroxy compound, $R(OH)_m$, such as phenol, a lower alkyl monohydric alcohol containing from 1 to 8 carbon atoms, inclusive, or a lower aliphatic polyhydric alcohol such as glycerol and pentaerithritol, and $m$ is an integer equal to the number of hydroxy groups of the hydroxy compound and not greater than 4.

The expression "phthalidyl" as herein employed refers to a radical

resulting from the removal of the hydroxyl group from the structure of phthalaldehydic acid or a phthalaldehydic acid chlorinated in the aromatic ring. The expression "phthalaldehydic acid" and "3-hydroxyphthalide" refer to a compound having the structure

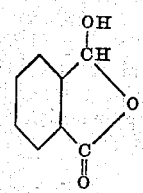

Phthalaldehydic acid is often represented in the literature as having the structure

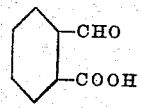

However, the acid employed in this invention and prepared as hereinafter described exists almost entirely in the closed ring, 3-hydroxyphthalide structure, as observed from a study of its infrared absorption spectrum. Infrared data also indicate the products to have a closed ring, 3-hydroxyphthalide structure with open chain ester sometimes being formed as byproduct.

The products of the present invention are generally liquids or viscous oils but may be solids. The properties are influenced by the length and composition of the polyglycol chain as well as by the phthalidyl group. In general, these compounds have good thermal stability, low vapor pressures, high flash points, good lubricating properties and are miscible with a variety of solvents. These compounds are useful as lubricants, blending and thickening agents, plasticizers and textile treating agents. Certain of these compounds also exhibit parasiticidal activity and may be used for the control of bacterial organisms.

Since the novel compounds of the present invention have the linkage phthalidyl-O-alkyleneoxy- they will henceforth be referred to as ethers. The phthalidyl ethers are mixtures of compounds having varying chain lengths since the starting polyglycol compounds are usually mixtures. Within the scope of the invention, the chain length may vary from 2 to 200 or more alkyleneoxy units. In general, those products having an average of from 3 to 50 alkyleneoxy units in the polyalkyleneoxy chain include those of greatest versatility and utility.

These phthalidyl ethers of polyglycol compounds may be prepared by causing phthalaldehydic acid to react with an appropriate polyglycol or ether thereof. The relative amount of reactants depends on the number of hydroxyl groups present in the polyglycol compound. A sufficient molar proportion of phthalaldehydic acid is employed to react with all the hydroxyl groups present in the molecule. The hydroxyl groups are determined as acetyl value and the average molecular weight is calculated therefrom. The reaction is carried out in the temperature range of from 50° to 250° C. at pressures varying from 5 millimeters to 760 millimeters with the formation of the desired phthalidyl ether and water of reaction. The desired product is freed of the water of reaction and low boiling by-products by vaporization of the latter components.

In carrying out the reaction, phthalaldehydic acid and the appropriate polyglycol or its monoether are mixed and heated in the temperature range of from 110° to 175° C. for 0.5 to 7 hours. Usually at the end of this period, the pressure on the system is reduced to about 5-20 millimeters and the reaction mixture slowly heated to a final temperature of from 140° to 200° C. to remove volatile material and to obtain as residue a phthalidyl ether of the appropriate polyglycol compound. If desired, a slow stream of nitrogen may be introduced into the reaction mixture to aid in the removal of volatile material. Stabilizers and antioxidants, such as p,p'-isopropylidenediphenol, which are oftentimes added to the product when the latter is employed as a plasticizer may be incorporated during the synthesis, if desired.

In an alternative method, the reactants are mixed and the pressure on the system reduced to 5-20 millimeters. The mixture is then heated gradually over a period of several hours to a temperature in the range of from 175° to 225° C. During the heating, the water of reaction and low boiling material become volatilized to leave the desired phthalidyl ether of the polyglycol compound as residue.

The phthalidyl ethers which are water insoluble may be prepared by an alternative method. According to this procedure, phthalaldehydic acid and the appropriate polyglycol or its monoether are mixed and heated in the temperature range of from 110° to 175° C. for from 1 to 7 hours. After completion of the reaction, the mixture is cooled and poured into water to precipitate the oily phthalidyl ether product. The latter is washed with water and then dissolved in benzene. The benzene solution is heated to distill (1) the water, as a benzene-water azeotrope, (2) the benzene solvent and (3) any low boiling material, and to obtain as product residue a purified phthalidyl ether of the appropriate polyglycol compound.

The following examples illustrate the invention, but are not to be construed as limiting.

Example 1

75 grams (0.5 mole) of phthalaldehydic acid and 286 grams (0.5 mole, based on free hydroxyl) of polyethylene glycol monomethyl ether having an average molecular weight of 572 were mixed and heated in the temperature range of from 165° to 175° C. for 7 hours. The reaction mixture was heated to 200° C. at 7 millimeters pressure for 1 hour to remove volatile material and to obtain as residue 250 grams of a polyethylene glycol methyl phthalidyl ether product having an average molecular weight of 704. 10.50 grams of the product dissolved in 95 grams of water and heated on the steam bath exhibited no cloud point. The latter was an amber liquid having a refractive index $n_D^{20}$ of 1.4874.

Example 2

150 grams (1.0 mole) of phthalaldehydic acid and 128 grams (0.5 mole, based on hydroxyl content) of polypropylene glycol having an average molecular weight of 256, were mixed and heated at 130° C. After about 0.5 hour of heating, water of reaction separated and formed a layer on top of the oil. The heating was continued for 7 hours and the mixture then cooled and poured into 500 milliliters of water whereupon a yellow oily diphthalidyl ether of polypropylene glycol precipitated. The latter was separated from the water, washed with water and then dissolved in benzene. The benzene solution was heated to distill first the residual water as a benzene-water azeotrope and then the solvent. The mixture was then heated to 200° C. at about 5 millimeters pressure to remove low boiling material. The product residue amounting to 208 grams having an average molecular weight of 520 was a light yellow viscous oil having a refractive index $n_D^{20}$ of 1.5225.

Example 3

126 grams (0.84 mole) of phthalaldehydic acid and 340 grams (0.42 mole, based on hydroxyl content) of polypropylene glycol having an average molecular weight of 809, were mixed and the system evacuated to give an initial pressure of 8 millimeters. The mixture was then heated from 50° to 200° C. during the first hour and from 200° to 215° C. during the second hour. Low boiling material vaporized during the heating process. The reaction mixture was allowed to cool and subsequently reheated under reduced pressure to 220° C. and again allowed to cool to obtain 450 grams or a 99 percent yield of a diphthalidyl ether of polypropylene glycol having an average molecular weight of 1073 as a viscous light yellow oil. The latter had a viscosity of 374.0 centistokes at 100° F. and 21.65 centistokes at 210° F.

Example 4

150 grams (1.0 mole) of phthalaldehydic acid and 405 grams (1.0 mole based on hydroxyl content) of polypropylene glycol monobutyl ether having an average molecular weight of 405, were mixed and heated under 15 millimeters pressure to a temperature of 150° C. over a 1 hour period. The temperature of the mixture was held between 140° and 150° C. during the second hour, raised to 180° C. during the next hour and then allowed to cool to obtain a polypropylene glycol butyl phthalidyl ether product having an average molecular weight of 537 as a light yellow viscous oil in a yield of 533.5 grams or 99 percent of theoretical. The product had a refractive index $n_D^{20}$ of 1.4749. The viscosity was 54.01 centistokes at 100° F. and 6.59 centistokes at 210° F. Infrared analysis supported the structure for a phthalidyl derivative of a polyglycol.

Example 5

150 grams (1.0 mole) of phthalaldehydic acid and 350 grams (1.0 mole, based on hydroxyl content) of polypropylene glycol monophenyl ether having an average molecular weight of 350, were mixed and heated at about 130° C. for 3 hours. The pressure on the system was reduced to about 10 millimeters and the low boiling material distilled therefrom, by heating to 140° C. and to obtain as an oil 467 grams of a polypropylene glycol phenyl phthalidyl ether product having an aveage molecular weight of 482. The latter had a refractive index of $n_D^{20}$ of 1.5096.

Example 6

In a process carried out in a manner similar to that described in Example 5, monophthalidyl ethers of polypropylene glycol monoethers were prepared as follows:

A polypropylene glycol octyl phthalidyl ether product having an average molecular weight of 706, a pale yellow liquid having a refractive index $n_D^{20}$ of 1.4697, by the reaction of phthalaldehydic acid with polypropylene glycol monooctyl ether having an average molecular weight of 574.

A polypropylene glycol methyl phthalidyl ether product having an average molecular weight of 620, an amber-colored liquid having a refractive index $n_D^{20}$ of 1.4728, by the reaction of phthalaldehydic acid with polypropylene glycol monomethyl ether having an average molecular weight of 488.

A polypropylene glycol methyl phthalidyl ether product having an average molecular weight of 1267, an amber-colored liquid having a refractive index $n_D^{20}$ of 1.4622, by the reaction of phthalaldehydic acid with polypropylene glycol monomethyl ether having an average molecular weight of 1135.

A polypropylene glycol butyl phthalidyl ether product having an average molecular weight of 1082, an amber-colored liquid having a refractive index $n_D^{20}$ of 1.4631, by the reaction of phthalaldehydic acid with polypropylene glycol monobutyl ether having an average molecular weight of 950.

A polyethylene glycol methyl phthalidyl ether product having an average molecular weight of 402, an amber-colored liquid having a refractive index $n_D^{20}$ of 1.4922 by the reaction of phthalaldehydic acid with polyethylene glycol monomethyl ether having an average molecular weight of 270.

*Example 7*

309 grams (1.50 moles) of tripropylene glycol monomethyl ether and 230 grams (1.53 moles) of phthalaldehydic acid were mixed and 7.6 grams of p,p'-isopropylidenediphenol added thereto and the resulting mixture heated in the temperature range of from 130° to 135° C. for 3 hours. At the end of this period, the pressure on the system was reduced to about 15 millimeters and the water removed by distilling until the temperature reached 130° C. The temperature of the reaction mixture was then increased to 170° C. while the system was maintained at 15 millimeters pressure and nitrogen passed therethrough to sweep out the volatile material and to obtain as residue 512 grams or a 99 percent yield of a tripropylene glycol methyl phthalidyl ether product. The latter was an amber-colored oil.

*Example 8*

In reactions carried out in a manner similar to that described in Example 7, phthalidyl ethers were prepared as follows.

Dipropylene glycol butyl phthalidyl ether, an amber-colored liquid, from the reaction of phthalaldehydic acid with dipropylene glycol monobutyl ether.

Diethylene glycol butyl phthalidyl ether, an amber-colored liquid, from the reaction of phthalaldehydic acid with diethylene glycol monobutyl ether.

Triethylene glycol ethyl phthalidyl ether, an amber-colored liquid, from the reaction of phthalaldehydic acid with triethylene glycol monoethyl ether.

*Example 9*

355 grams (2.37 moles) of phthalaldehydic acid and 159 grams (1.18 moles) of dipropylene glycol were mixed and heated at about 125° C. for 0.5 hour. The reaction mixture was heated to distill the water and low boiling material by gradually increasing the temperature to 190° C. over a period of 1.5 hours. The mixture was cooled, the pressure reduced to 15 millimeters and then reheated to 195° C. and maintained at that temperature for a period of 1.5 hours to obtain as residue 457 grams of a dipropylene glycol diphthalidyl ether product as a light yellow viscous liquid having a refractive index $n_D^{20}$ of 1.5453.

*Example 10*

225 grams (1.5 moles) of phthalaldehydic acid and 352 grams (1.5 moles) of tripropylene glycol isopropyl ether were mixed and heated at about 120° C. under reflux for one hour. At the end of this period, the system was evacuated to obtain a pressure of about 10 millimeters and the heating continued to distill low boiling material. The residual oil was purified by treating with 6 grams of activated charcoal, heating on the steam bath for 2 hours and filtering to recover the purified material. The latter was mixed with 8 grams of p,p'-isopropylidenediphenol and the mixture fractionally distilled to obtain 314 grams or a 57 percent yield of a tripropylene glycol isopropyl phthalidyl ether product. The latter had a boiling point range of from 210° to 218° C. at 1 millimeter pressure.

*Example 11*

225 grams (1.5 moles) of phthalaldehydic acid and 273.5 grams (1.5 moles, based on hydroxyl content) of polypropylene glycol mono-secondary-butyl ether having an average molecular weight of 182 were mixed and heated at 120° C. for 3 hours. The pressure on the system was reduced to about 20 millimeters and the heating continued to remove material boiling below 140° C. under reduced pressure and to obtain a polypropylene glycol phthalidyl secondary butyl ether product having an average molecular weight of 314 as residue. The latter, a dark-colored oil, was poured into two liters of hot water. Most of the water was decanted, and the oil extracted with benzene. The benzene extract was treated with activated charcoal and then distilled to a final temperature and pressure of 140° C. and about 15 millimeters to remove the solvent and low boiling material. The purified product obtained in an amount of 400 grams or 85 percent of theoretical was an amber-colored oil having a refractive index $n_D^{20}$ of 1.5048.

*Example 12*

6 grams (0.04 mole) of phthalaldehydic acid and 200 grams (0.02 mole) of polyethylene glycol having an average molecular weight of 10,000 were mixed and heated in the temperature range of from 120° to 150° C. for 3 hours to obtain a polyethylene glycol diphthalidyl ether product as a waxy solid. The latter had a melting point of 61°–63° C.

*Example 13*

70.7 grams (0.471 mole) of phthalaldehydic acid and 200 grams (0.235 mole, based on hydroxyl content) of a poly(ethyleneoxy-propyleneoxy) glycol (a polyglycol melting at 27.4°–29.9° C. and obtained by the reaction of 9 moles of propylene oxide on a polyethylene glycol having an average molecular weight of 852) were mixed and heated in the temperature range of from 150° to 160° C. under reflux for 1.5 hours. The pressure on the system was reduced to 10 millimeters and the heating continued to a temperature of 140° C. to remove volatile material and to obtain as residue a poly(ethyleneoxy-propyleneoxy) glycol diphthalidyl ether product having an average molecular weight of 1116 in an amount of 262 grams or 99 percent of theoretical. The latter was a viscous, light amber-colored liquid having a refractive index $n_D^{25}$ of 1.4901.

*Example 14*

93 grams (0.5 mole) of x-chlorophthalaldehydic acid (a phthalaldehydic acid containing a chlorine atom in the aromatic ring) and 64 grams (0.25 mole, based on free hydroxyl) of a polypropylene glycol having an average molecular weight of 256 were mixed and heated in the temperature range of from 145° to 160° C. for 7 hours. At the end of this period, the mixture was poured into 500 milliliters of dilute sodium bicarbonate solution whereupon an oil precipitated. The latter was separated from the aqeuous solution and washed with water. The aqueous solution and the wash liquid were extracted with benzene, and the benzene extract combined with the oil. The resulting mixture was then heated to 200° C. at 15 millimeters pressure to distill water, solvent and low-boiling material and to obtain as residue a polypropylene glycol di-x-chlorophthalidyl ether product having an average molecular weight of 589 in a yield of 128 grams. The latter was a viscous, amber-colored liquid having a refractive index $n_D^{60}$ of 1.5186.

*Example 15*

112.5 grams (0.75 mole) of phthalaldehydic acid and 275 grams (0.25 mole, based on hydroxyl content) of a trihydroxy poly(ethyleneoxy-propyleneoxy) ether of glycerol (prepared as described in U.S. 2,733,272 and having an average molecular weight of 1100 and a viscosity of 99–101 centistokes at 100° F. and 13–14 centistokes at 210° F.) were mixed and heated to 80° C. The pressure on the system was gradually reduced to 10 millimeters and heating was continued up to a temperature of 130° to 140° C. and thereafter maintained at such temperature for 6 hours. The temperature was then raised to 200° C. to distill low boiling material and to obtain 374 grams of a triphthalidyl ether of a poly(ethyleneoxy-propyleneoxy) ether of glycerol. The latter was a yellow oil having a viscosity of 597 centistokes at 100° F. and 32.5 centistokes at 210° F.

*Example 16*

10 grams (0.066 mole) of phthalaldehydic acid and 126 grams (0.022 mole, based on hydroxyl content) of a trihydroxy poly(ethyleneoxy-propyleneoxy) ether of glycerol (prepared as described in U.S. 2,733,272 and having an average molecular weight of 5720 and viscosity of 593 centistokes at 100° F. and 91.6 centistokes at 210° F.) were mixed and heated to about 160° C. whereupon a vigorous reaction occurred. After the initial exothermic reaction took place, the mixture was heated to 170° C. to obtain 106.5 grams of a triphthalidyl ether of a poly(ethyleneoxy-propyleneoxy) ether of glycerol. The latter was an oil having a viscosity of 830 centistokes at 100° F. and 110 centistokes at 210° F.

*Example 17*

15 grams (0.1 mole) of phthalaldehydic acid and 108 grams (0.05 mole, based on free hydroxyl) of polybutylene glycol were mixed and heated in the temperature range of from 160° to 180° C. for 3 hours. The pressure on the system was then slowly reduced to distill the water. The heating was continued to a temperature of 160° C. at 15 millimeters pressure to remove volatile material and to obtain as residue a polybutylene glycol diphthalidyl ether having an average molecular weight of 2414. The latter was an amber-colored liquid having a refractive index $n_D^{20}$ of 1.4666 and amounted to 120.5 grams or 99 percent of theoretical.

*Example 18*

70 grams (0.466 mole) of phthalaldehydic acid and 114 grams (0.233 mole, based on free hydroxyl) of polybutylene glycol were mixed and heated at about 140° C. for 3 hours. The pressure on the system was then slowly reduced to distill the water and the heating continued to a temperature of 140° C. at 15 millimeters pressure to remove volatile material and to obtain as residue a polybutylene glycol diphthalidyl ether having an average molecular weight of 754. The latter was an amber-colored liquid having a refractive index $n_D^{20}$ of 1.4989 and amounted to 174 grams or 99 percent of theoretical.

The disclosed phthalidyl ethers of polyglycols have plasticizing properties. Those ethers in the molecular weight range of from 400 to 1000 are adapted to be employed in plasticizing such systems as vinyl lacquer films. For example, vinylite resin having a chemical composition of 85–88 percent vinyl chloride and 12–15 percent vinyl acetate plasticized at a 15 percent concentration level with tripropylene glycol isopropyl phthalidyl ether containing a small amount of p,p'-isopropylidenediphenol as stabilizer had better elongation properties than the same resin plasticized at the same level with the commonly employed dioctyl phthalate plasticizer. In a representative operation, a 25 percent solids solution comprising 85 parts by weight of the above vinylite resin and 15 parts by weight of tripropylene glycol isopropyl phthalidyl ether stabilized with 1.5 weight percent of p,p'-isopropylidenediphenol in 50:50 methyl ethyl ketone-toluene solvent, when cast on glass plates as 15 mil wet thickness film and the latter dried and tested for elongation gave a value of 42 percent while a similar film prepared from a 25 percent solids solution containing 85 parts by weight of vinylite resin and 15 parts by weight of dioctyl phthalate gave an elongation value of 5 percent.

The microbicidal properties of these compounds may be illustrated by a representative example wherein a solid agar medium saturated with polypropylene glycol diphthalidyl ether having an average molecular weight of 1000 gave complete inhibition of growth when streaked with *Staphylococcus aureus* and incubated at 30° C. for three days.

The phthalaldehydic acid may be prepared by photochlorinating o-xylene to obtain α,α,α,α',α'-pentachloro-o-xylene by passing chlorine gas into o-xylene while the latter is illuminated with sun lamps. The resulting chlorinated o-xylene is then heated with aqueous constant-boiling hydrochloric acid containing 10 percent ferric chloride solution to obtain the phthalaldehydic acid, as more fully disclosed and claimed in a copending application of James D. Head and Owen D. Ivins, Serial Number 279,682, filed March 31, 1952, now Patent No. 2,748,162.

The x-chlorophthalaldehydic acid employed in this invention may be prepared by first chlorinating o-xylene in the presence of ferric chloride in the temperature range of from 5° to 15° C. to obtain a ring-chlorinated product, x-chloro-o-xylene. The ring-chlorinated product is then photochlorinated to obtain α,α,α,α',α'-x-hexachloro-o-xylene and the latter hydrolyzed in a manner similar to that described above for phthalaldehydic acid.

We claim:

1. A phthalidyl ether selected from the group consisting of (1) a phthalidyl ether of a polyglycol and represented by the structure

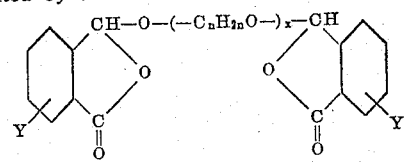

wherein Y is selected from the group consisting of hydrogen and chlorine, *n* represents an integer of from 2 to 4, inclusive, each (—C$_n$H$_{2n}$O—) is selected from the group consisting of ethyleneoxy, propyleneoxy and butyleneoxy, and *x* is an integer of from 2 to a number sufficient to provide a molecular weight of up to about 10,000 due to the portion of the molecule represented by —O—(C$_n$H$_{2n}$O—)$_x$—, and (2) a phthalidyl ether of a polyglycol ether and represented by the structure

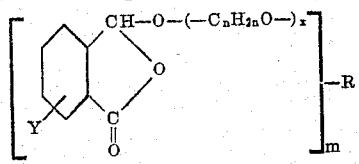

wherein Y is selected from the group consisting of hydrogen and chlorine, R is a hydrocarbon radical of a hydroxy compound, $R(OH)_m$, selected from the group consisting of phenol, a lower alkyl monohydric alcohol containing from 1 to 8 carbon atoms, inclusive, glycerol and pentaerithritol, $m$ is an integer equal to the number of hydroxy groups of the hydroxy compound and not greater than 4, $n$ represents an integer of from 2 to 4, inclusive, each $(—C_nH_{2n}O—)$ is selected from the group consisting of ethyleneoxy, propyleneoxy and butyleneoxy, and $x$ is an integer of from 2 to a number sufficient to provide a molecular weight of up to about 10,000 due to the portion of the molecule represented by

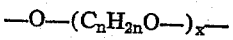

2. A phthalidyl ether of a polyglycol and represented by the structure

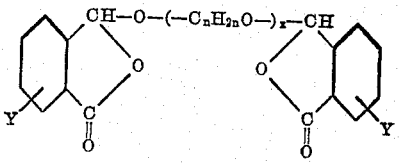

wherein Y is selected from the group consisting of hydrogen and chlorine, $n$ represents an integer of from 2 to 4, inclusive, each $(—C_nH_{2n}O—)$ is selected from the group consisting of ethyleneoxy, propyleneoxy and butyleneoxy, and $x$ is an integer of from 2 to a number sufficient to provide a molecular weight of up to about 10,000 due to the portion of the molecule represented by $—O—(C_nH_{2n}O—)_x—$.

3. A phthalidyl ether of a polyglycol ether and represented by the structure

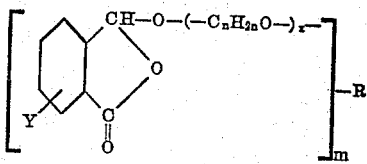

wherein Y is selected from the group consisting of hydrogen and chlorine, R is a hydrocarbon radical of a hydroxy compound, $R(OH)_m$, selected from the group consisting of phenol, a lower alkyl monohydric alcohol containing from 1 to 8 carbon atoms, inclusive, glycerol and pentaerithritol, $m$ is an integer equal to the number of hydroxy groups of the hydroxy compound and not greater than 4, $n$ represents an integer of from 2 to 4, inclusive, each $(—C_nH_{2n}O—)$ is selected from the group consisting of ethyleneoxy, propyleneoxy and butyleneoxy, and $x$ is an integer of from 2 to a number sufficient to provide a molecular weight of up to about 10,000 due to the portion of the molecule represented by

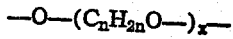

4. A method for preparing a phthalidyl ether claimed in claim 1 which comprises the step of heating a phthalaldehydic acid having the structure

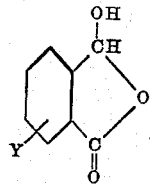

with a member of the group consisting of (a) a polyglycol having the structure

and (b) a polyglycol ether having the structure

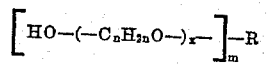

in the temperature range of from 50° to 250° C. at a pressure of from 5 to 760 millimeters, wherein R is a hydrocarbon radical of a hydroxy compound, $R(OH)_m$, selected from the group consisting of phenol, a lower alkyl monohydric alcohol containing from 1 to 8 carbon atoms, inclusive, glycerol and pentaerithritol, Y is selected from the group consisting of hydrogen and chlorine, $n$ represents an integer of from 2 to 4, inclusive, each $(—C_nH_{2n}O—)$ is selected from the group consisting of ethyleneoxy, propyleneoxy and butyleneoxy, and $x$ is an integer of from 2 to a number sufficient to provide a molecular weight of up to about 10,000 due to the portion of the molecule represented by

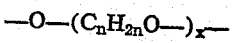

and $m$ is equal to the number of hydroxy groups of the hydroxy compound and not greater than 4.

References Cited in the file of this patent

UNITED STATES PATENTS

| | | |
|---|---|---|
| 1,941,474 | Jaeger | Jan. 2, 1934 |
| 2,161,025 | Doolittle | June 6, 1939 |
| 2,657,186 | Klein et al. | Oct. 27, 1953 |
| 2,817,668 | Wheeler et al. | Dec. 24, 1957 |

OTHER REFERENCES

The Condensed Chemical Dictionary, p. 880, 5th edition, Reinhold, N.Y. (1956).

Auwers et al.: Berichte, vol. 52, pp. 587, 596 (1919).